Figure 1:
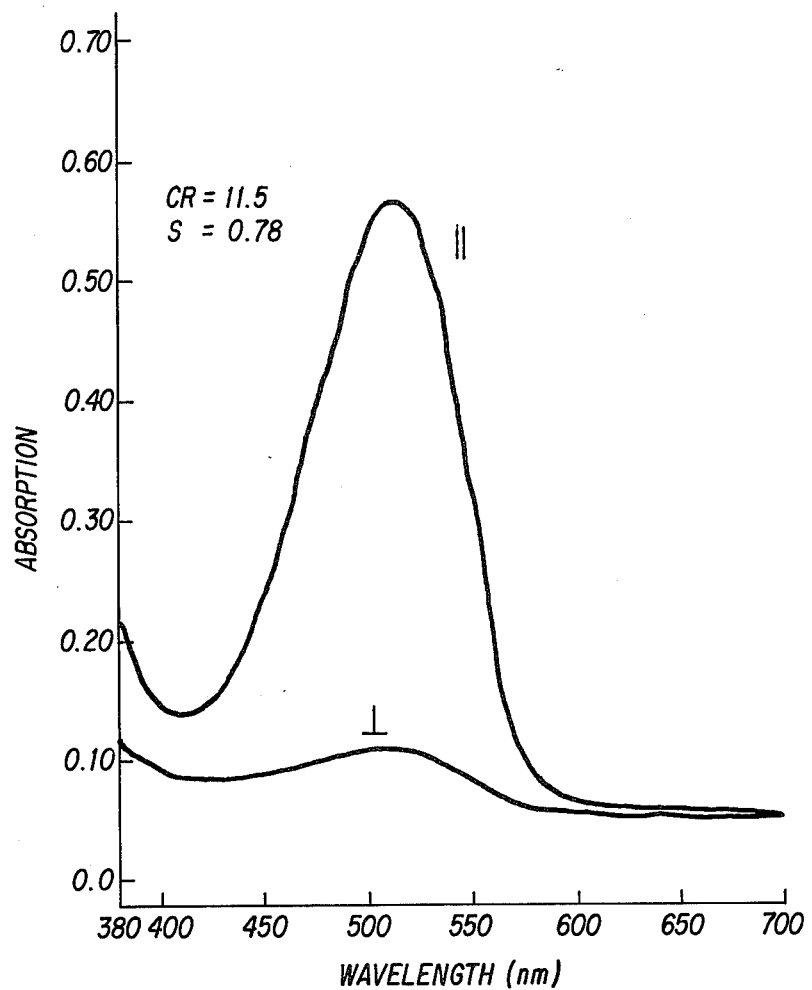

United States Patent [19]

Ditter et al.

[11] Patent Number: 4,466,899

[45] Date of Patent: Aug. 21, 1984

[54] DYES FOR USE IN LIQUID CRYSTAL MIXTURES

[75] Inventors: Walter Ditter, Heidelberg; Karl-Heinz Etzbach, Mannheim; Dieter Horn, Heidelberg; Manfred Patsch, Wachenheim; Heinz Eilingsfeld, Frankenthal, all of Fed. Rep. of Germany

[73] Assignee: BASF Aktiengesellschaft, Ludwigshafen, Fed. Rep. of Germany

[21] Appl. No.: 336,709

[22] Filed: Jan. 4, 1982

[30] Foreign Application Priority Data

Jan. 10, 1981 [DE] Fed. Rep. of Germany ....... 3100533
Apr. 15, 1981 [DE] Fed. Rep. of Germany ....... 3115147

[51] Int. Cl.$^3$ .......................... C09K 3/34; G02F 1/13
[52] U.S. Cl. .................................. 252/299.1; 350/349
[58] Field of Search ...................... 252/299.1; 250/349

[56] References Cited

U.S. PATENT DOCUMENTS

| | | | |
|---|---|---|---|
| 4,288,147 | 9/1981 | Koch | 252/299.1 |
| 4,299,720 | 11/1981 | Osman et al. | 252/299.1 |
| 4,304,683 | 12/1981 | Morinaka et al. | 252/299.1 |
| 4,356,102 | 10/1982 | Aftergut et al. | 252/299.1 |
| 4,358,392 | 11/1982 | Cognard et al. | 252/299.1 |
| 4,360,447 | 11/1982 | Morinaka et al. | 252/299.1 |
| 4,363,743 | 12/1982 | Moeller et al. | 252/299.1 |
| 4,376,715 | 3/1983 | Cognard et al. | 252/299.1 |

FOREIGN PATENT DOCUMENTS

| | | | |
|---|---|---|---|
| 2104 | 5/1979 | European Pat. Off. | 252/299.1 |
| 26004 | 4/1981 | European Pat. Off. | 252/299.1 |
| 25809 | 4/1981 | European Pat. Off. | 252/299.1 |
| 0038460 | 10/1981 | European Pat. Off. | 252/299.1 |
| 44893 | 2/1982 | European Pat. Off. | 252/299.1 |
| 2815335 | 10/1978 | Fed. Rep. of Germany | 252/299.1 |
| 2920730 | 11/1979 | Fed. Rep. of Germany | 252/299.1 |
| 2903095 | 7/1980 | Fed. Rep. of Germany | 252/299.1 |
| 2902177 | 7/1980 | Fed. Rep. of Germany | 252/299.1 |
| 3006744 | 9/1980 | Fed. Rep. of Germany | 252/299.1 |
| 3009974 | 9/1980 | Fed. Rep. of Germany | 252/299.1 |
| 3009940 | 9/1980 | Fed. Rep. of Germany | 252/299.1 |
| 3028593 | 2/1981 | Fed. Rep. of Germany | 252/299.1 |
| 3038372 | 5/1981 | Fed. Rep. of Germany | 252/299.1 |
| 2071685 | 9/1981 | United Kingdom | 252/299.1 |

OTHER PUBLICATIONS

Cognard, J., et al., Mol. Cryst. Liq. Cryst., vol. 70, pp. 1–19, (1981).
Bloom, A., et al., Mol. Cryst. Liq. Cryst., vol. 41 (Letters), pp. 1–4, (1977).
G. W. Gray, Chima 34, (1980), pp. 37 to 57.
F. Gories, T. J. Reeve, JSDC, Oct. 1979, pp. 35 to 59.
Robert J. Cox, Nol. Cryst. Liq. Cryst., 1979, vol. 55, pp. 7 to 32.
Photostatable Anthraquinone Pleochroic Dyes, Mol. Cryst. Liq. Crystal, 59, 1980, pp. 299–316.

Primary Examiner—Teddy S. Gron
Attorney, Agent, or Firm—Oblon, Fisher, Spivak, McClelland & Maier

[57] ABSTRACT

The use of a dye of the general formula I

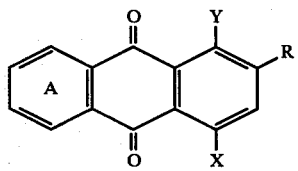

where R is a heterocyclic radical, X is hydrogen, nitro, or unsubstituted or substituted amino, hydroxyl or mercapto and Y is hydrogen, nitro, or unsubstituted or substituted amino, hydroxyl or mercapto, and the ring A can be additionally substituted, in an electro-optical display containing liquid crystals, and a liquid-crystal mixture containing a dye of the general formula in claim 1.

4 Claims, 2 Drawing Figures

DYES FOR USE IN LIQUID CRYSTAL MIXTURES

The present invention relates to the use of a dye of the general formula I

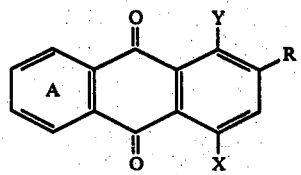

where R is a heterocyclic radical, X is hydrogen, nitro, or unsubstituted or substituted amino, hydroxyl or mercapto and Y is hydrogen, nitro, or unsubstituted or substituted amino, hydroxyl or mercapto, and the ring A can be additionally substituted, in an electro-optical display containing liquid crystals.

Heterocyclic radicals R are, in particular, 5-membered or 6-membered heterocyclic structures from the oxazole, oxadiazole, thiazole, thiadiazole, imidazole or triazole series, which carry unsubstituted or substituted and/or fused rings. Specific examples of R correspond to the formulae

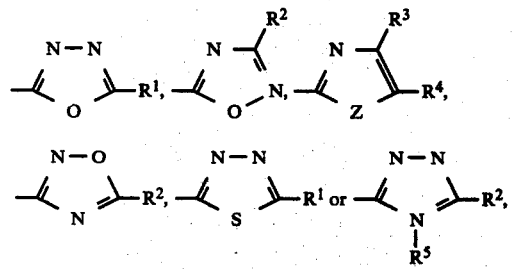

where $R^1$ is hydrogen, unsubstituted or substituted alkyl, cycloalkyl or aryl, unsubstituted or substituted alkylmercapto or cycloalkylmercapto, $R^2$ is hydrogen, unsubstituted or substituted alkyl, cycloalkyl or aryl, $R^3$ is hydrogen, unsubstituted or substituted alkyl, cycloalkyl or phenyl, or alkoxycarbonyl, $R^4$ is hydrogen, unsubstituted or substituted alkyl, cycloalkyl or phenyl, or alkoxycarbonyl, $R^3$ and $R^4$ together are an unsubstituted or substituted, benzo-fused ring, $R^5$ is hydrogen or unsubstituted or substituted alkyl, cycloalkyl or phenyl, and Z is O, S or NH.

Examples of $R^1$ are $C_1-C_{12}$-alkyl, $C_2-C_8$-alkyl which is substituted by hydroxyl, $C_1-C_8$-alkoxy or phenyl and may be interrupted by oxygen, $C_5-C_7$-cycloalkyl, phenyl which is unsubstituted or substituted by $C_1-C_8$-alkyl, $C_1-C_8$-alkoxy, phenoxy, phenoxyalkyl, $C_1-C_8$-alkanoyloxy, benzoyloxy, phenylalkyl, phenyl, cyanophenyl, biphenylyl, styryl, cyanostyryl, cyclohexyl or chlorine, styryl, cyanostyryl, $C_1-C_8$-alkylmercapto which may be interrupted by oxygen and/or sulfur, $C_5-C_7$-cycloalkylmercapto, and aralkylmercapto which is substituted by $C_1-C_{12}$-alkyl which may be interrupted by oxygen and/or sulfur, $C_1-C_{12}$-alkoxy, phenoxy, phenylalkoxy, phenoxyalkyl, $C_1-C_8$-alkanoyloxy, benzoyloxy, phenylalkyl, phenyl, biphenylyl, cyclohexyl, cyclohexylalkoxy, alkoxycarbonyl, cyano, styryl, cyanostyryl or chlorine.

Specific examples of $R^1$ are methyl, ethyl, butyl, methoxymethyl, 2-methoxyethyl, 2-ethoxyethyl, 2-butoxyethyl, cyclohexyl, 2-cyclohexoxyethyl, phenoxymethyl, 2-phenoxyethyl, 2-phenylethyl, phenyl, 4-methylphenyl, biphenylyl, 4-cyclohexylphenyl, methylthio, ethylthio, butylthio, n-octylthio, cyclohexylthio, 2-methoxyethylthio, phenylmethylthio, 2-phenylethylthio, 2-phenoxyethylthio, 4-cyanophenylmethylthio, 4-phenoxyphenylmethylthio, 4-(phenylmethoxy)-phenylmethylthio or 4-(2-phenylethyl)-phenylmethylthio, 4-acetoxyphenylmethylthio, 4-butyryloxyphenylmethylthio, 4-caproyloxyphenylmethylthio, 4-benzoyloxyphenylmethylthio and 4-(cyclohexylmethoxy)-phenylmethylthio.

Examples of $R_2$ are as given for $R_1$, provided they fall within the general definition of $R_2$.

Examples of $R^3$ or $R^4$ are $C_1-C_4$-alkyl, phenyl which is unsubstituted or substituted by $C_1-C_4$-alkyl, chlorine or bromine, $C_5-C_7$-cycloalkyl and $C_1-C_{12}$-alkoxycarbonyl.

Specific examples of $R^3$ or $R^4$, which may be identical or different, are methyl, ethyl, phenyl, p-chlorophenyl, ethoxycarbonyl, butoxycarbonyl and cyclohexyl.

Fused benzene rings ($R^3$ and $R^4$ together) can be substituted, for example by methyl, ethyl, methoxy, ethoxy, butoxy or chlorine.

Examples of $R^5$ are hydrogen, methyl, ethyl, butyl, phenyl, 4-ethylphenyl and 4-butylphenyl.

Examples of X are hydrogen, amino, methylamino, butylamino, octylamino, cyclohexylamino, phenylmethylamino, phenylamino, 4-ethylphenylamino, 4-butylphenylamino, 4-chlorophenylamino, hydroxyl, ethoxy, butoxy, phenoxy, 4-ethylphenoxy, mercapto, ethylthio, phenylthio and nitro.

Examples of Y are as given for X, provided they fall within the general definition of Y.

Ring A can be additionally substituted, for example, by chlorine or bromine or a radical R or X.

Preferred compounds, of the formula I, for use according to the invention are those in which one of the radicals X and Y, preferably Y, is amino and R is thiazolyl, oxadiazolyl or thiadiazolyl.

Examples of preferred substituents for these radicals are: $R^1$: propyl, butyl, hexyl, phenyl, biphenyl-4-yl, 2-methoxyethylthio, 2-butoxyethylthio, butylthio, phenoxymethyl, 2-phenoxyethyl, phenylmethylthio, 4-butyryloxyphenylmethylthio, 4-benzoyloxyphenylmethylthio, 4-phenoxyphenylmethylthio, 4-(phenylmethoxy)-phenylmethylthio, biphenyl-4-ylmethylthio, cyclohexylthio and 4-(cyclohexylmethoxy)-phenylmethylthio; $R^2$: propyl, butyl, hexyl, phenylmethyl, phenyl, biphenyl-4-yl), phenoxymethyl, 2-phenoxyethyl and 2-methoxyethyl.

Symmetrical 1,3,4-oxadiazolyl and symmetrical 1,3,4-thiadiazolyl are particularly preferred.

Liquid-crystal mixtures and their use have already been disclosed, for example in German Laid-Open Applications DOS No. 2,902,177, DOS No. 2,903,095 and DOS No. 2,950,944. Further literature and the theoretical basis of the novel use are also given in these Laid-Open Applications.

Compared to the compounds previously proposed for use according to the invention, the compounds of the formula I have a particularly high dichroic ratio, good lightfastness and good solubility in liquid-crystalline media. Furthermore, they can be readily obtained in a pure form.

The dyes can be prepared according to conventional processes.

The measurements were carried out in the nematic phase of Merck ZLJ-1691.

Examples 1–8 are the following anthraquinone dyes:

| Example | Structure | Color |
|---|---|---|
| 1 | 1-NH$_2$, 2-C(=N-N=C(O-CH$_2$-O-C$_6$H$_5$))- anthraquinone | red |
| 2 | 1-NH$_2$, 2-C(=N-N=C(S-CH$_2$-C$_6$H$_5$))S- anthraquinone | red |
| 3 | 1-NH$_2$, 2-C(=N-N=C(S-CH$_2$-C$_6$H$_4$-O-CH$_2$-C$_6$H$_5$))O- anthraquinone | red |
| 4 | 1-OH, 2-C(=N-N=C(S-CH$_2$-C$_6$H$_5$))S- anthraquinone | yellow |
| 5 | 1-OH, 4-NH$_2$, 2-C(=N-N=C(S-CH$_2$-C$_6$H$_4$-O-C(=O)-C$_3$H$_7$))O- anthraquinone | violet |
| 6 | 1-S-C$_6$H$_5$, 2-C(=N-N=C(S-CH$_2$-C$_6$H$_5$))S- anthraquinone | yellow |
| 7 | 1,4-(H$_2$N)$_2$, 6-C(=N-N=C(S-CH$_2$-C$_6$H$_4$-O-C$_6$H$_5$))S- anthraquinone | blue |
| 8 | 1-NH$_2$, 5-NH$_2$, 2-C(=N-N=C(S-C$_4$H$_9$))O- anthraquinone | red |

The measurements were carried out on a Hewlett-Packard 8450 spectrophotometer. The dichroic ratio CR was determined by measuring the parallel extinction (E″) and the perpendicular extinction (E′) and using the relationship $$CR = \frac{E''}{E\perp}.$$

Commercial measuring cells with a layer thickness of 10 μm were employed for this purpose.

The degree of order S was calculated according to the conventional equation $$S = \frac{CR - 1}{CR + 2}.$$

The absorption spectra in parallel-polarized and perpendicular-polarized light are given in FIG. 1 for compound 2.
The dichroic ratio and the degree of order are summarized in Table 1 for the dyes 1 to 8.
TABLE 1
| Dye | CR | S |
|---|---|---|
| 1 | 9.8 | 0.75 |
| 2 | 11.5 | 0.78 |
TABLE 1-continued
| Dye | CR | S |
|---|---|---|
| 3 | 11.0 | 0.77 |
| 4 | 7.5 | 0.68 |
| 5 | 11.1 | 0.77 |
| 6 | 10.0 | 0.75 |
| 7 | 8.8 | 0.72 |
| 8 | 11.7 | 0.78 |
The compounds 9 to 18 below are blue.
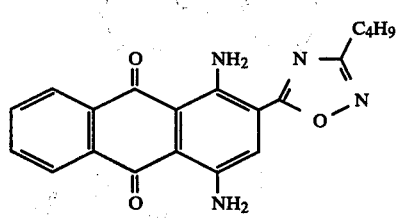
9.
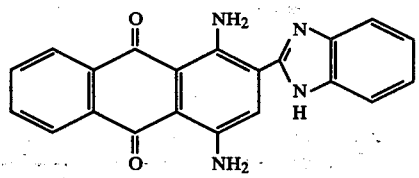
10.
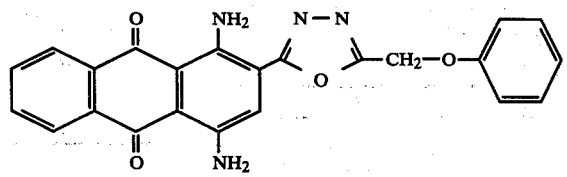
11.
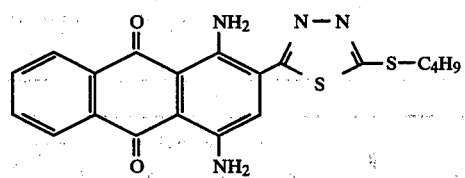
12.
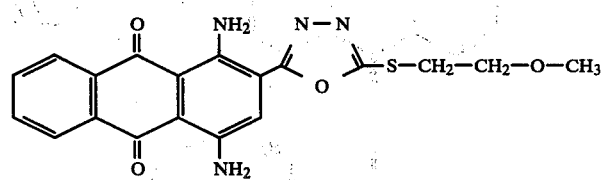
13.
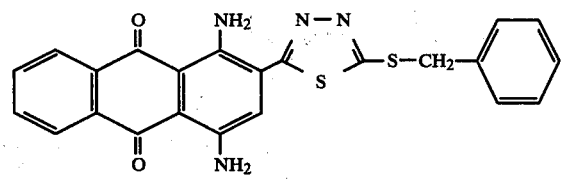
14.
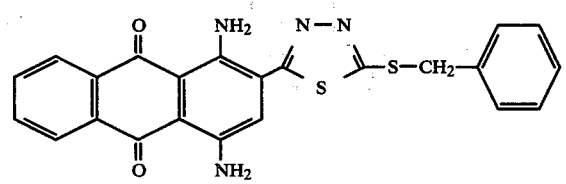
15.

Figure 2:
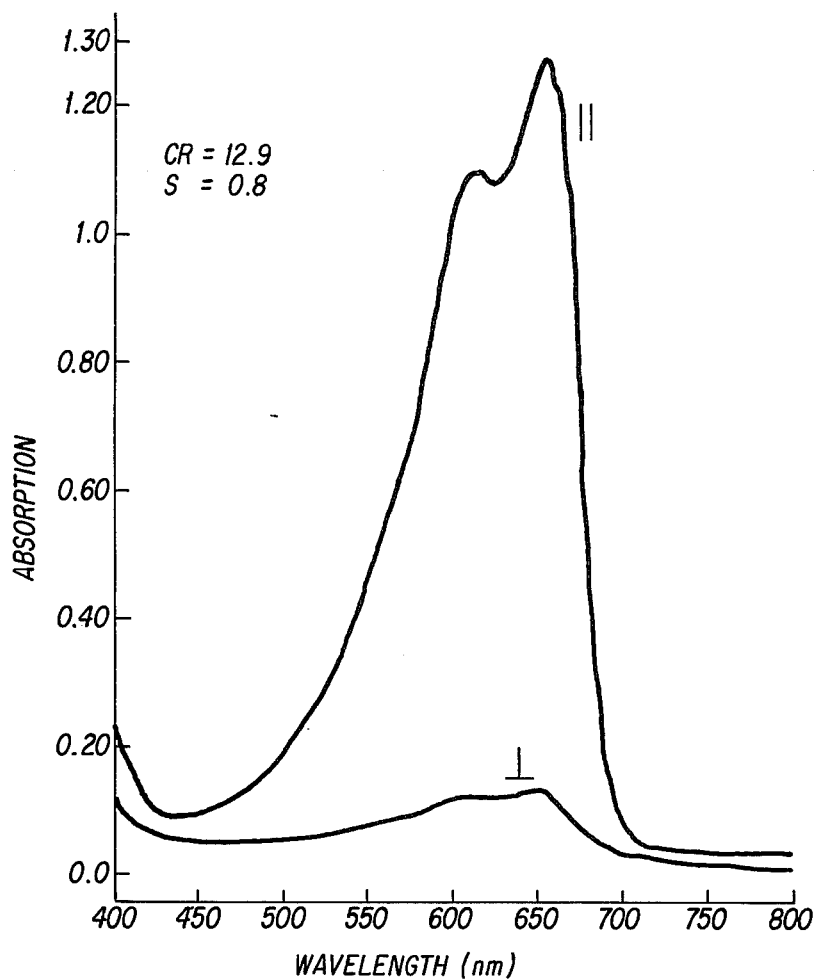

16. 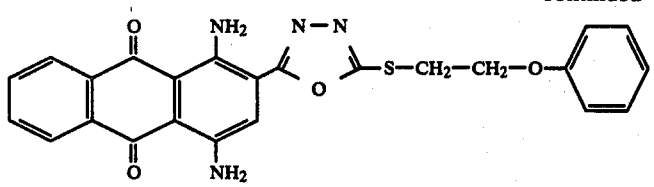
17. 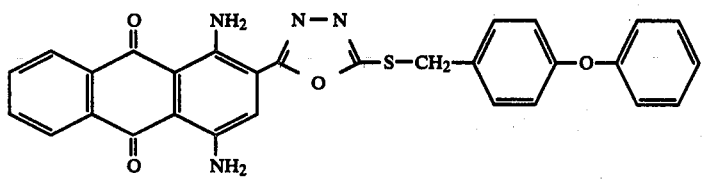
18. 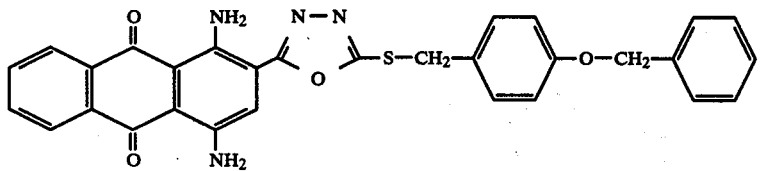
The absorption spectra in parallel-polarized and perpendicular-polarized light are given in FIG. 2 for compound 15.
The dichroic ratio and the degree of order are summarized in Table 2 for dyes 9 to 18.
TABLE 2
| Dye | CR | S |
|---|---|---|
| 9 | 8.5 | 0.72 |
| 10 | 5.6 | 0.60 |
| 11 | 9.2 | 0.73 |
TABLE 2-continued
| Dye | CR | S |
|---|---|---|
| 12 | 10.0 | 0.75 |
| 13 | 10.7 | 0.76 |
| 14 | 9.1 | 0.73 |
| 15 | 12.9 | 0.79 |
| 16 | 11.3 | 0.77 |
| 17 | 9.1 | 0.73 |
| 18 | 12.8 | 0.80 |
The further useful compounds listed below have the dichroic ratios and degrees of order given in Table 3.
| Example | | Color |
|---|---|---|
| 19 | 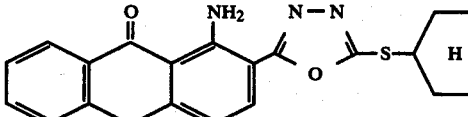 | blue |
| 20 | 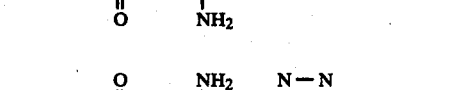 | blue |
| 21 | 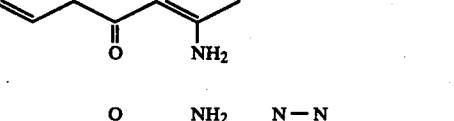 | blue |

-continued
| Example | | Color |
|---|---|---|
| 22 | 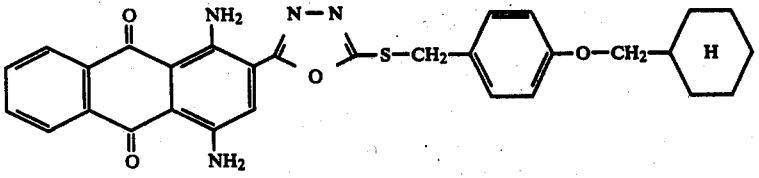 | blue |
| 23 | 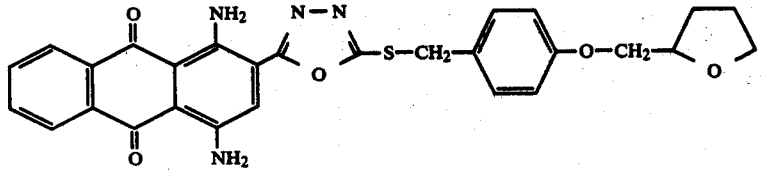 | blue |
| 24 | 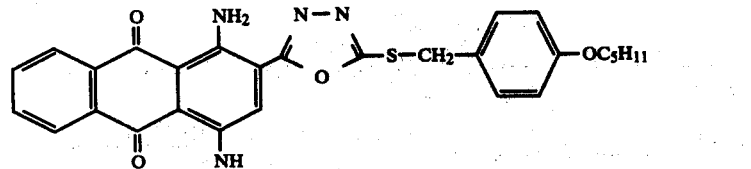 | blue |
| 25 | 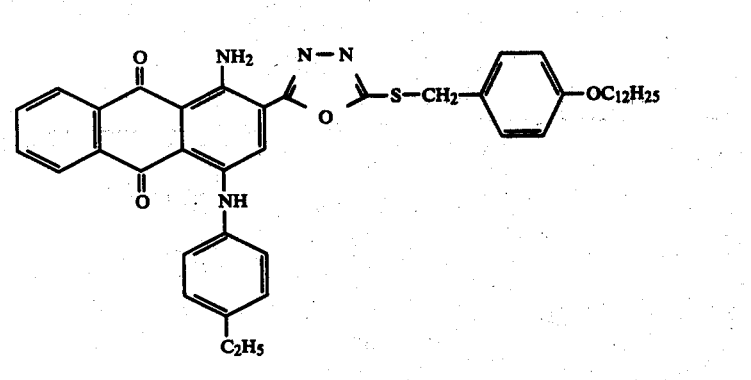 | blue |
| 26 | 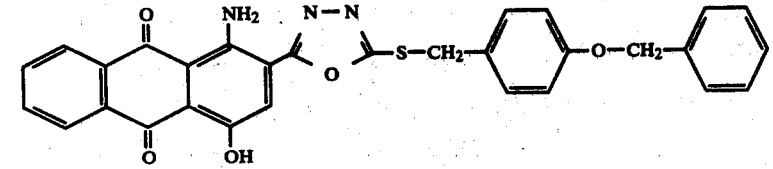 | violet |
| 27 | 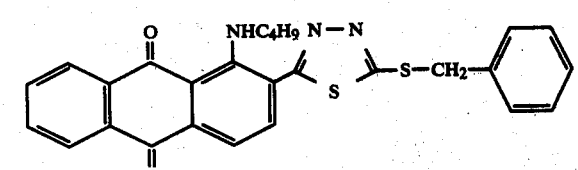 | red |
| 28 | 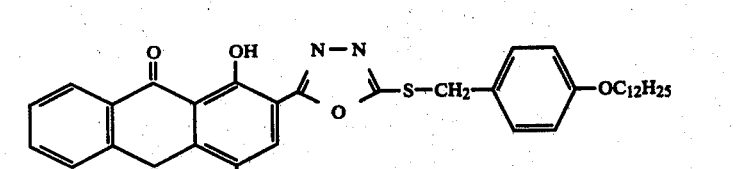 | yellow |

-continued

| Example | | Color |
|---|---|---|
| 29 | 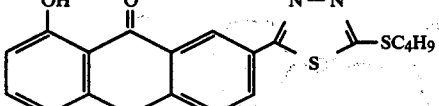 | yellow |
| 30 |  | red |

TABLE 3

| Dye | CR | S |
|---|---|---|
| 19 | 8.9 | 0.73 |
| 20 | 10.0 | 0.75 |
| 21 | 12.8 | 0.80 |
| 22 | 12.4 | 0.79 |
| 23 | 11.3 | 0.77 |
| 24 | 10.7 | 0.76 |
| 25 | 10.0 | 0.75 |
| 26 | 11.6 | 0.78 |
| 27 | 6.9 | 0.66 |
| 28 | 7.4 | 0.68 |
| 29 | 7.9 | 0.70 |
| 30 | 10.4 | 0.76 |

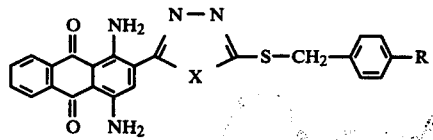

| No. | X | R | Color |
|---|---|---|---|
| 31 | O | —$C_4H_9$ | blue |
| 32 | O | —$C(CH_3)_3$ | " |
| 33 | O | —$C_6H_{13}$ | " |
| 34 | O | —$C_8H_{17}$ | " |
| 35 | O | —$CH_2CH\begin{matrix}C_2H_5\\C_4H_9\end{matrix}$ | " |
| 36 | O | —$C_9H_{19}$ | " |
| 37 | O | —$C_{13}H_{27}$ | " |
| 38 | O | —⟨H⟩ | " |
| 39 | O | —⟨H⟩—$CH_3$ | " |
| 40 | O | —⟨H⟩—$C_2H_5$ | " |

-continued

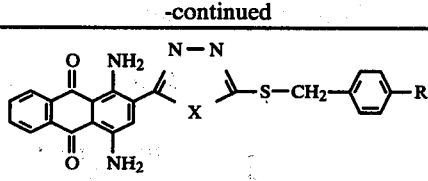

| No. | X | R | Color |
|---|---|---|---|
| 41 | O | —⟨H⟩—$C_4H_9$ | " |
| 42 | S | —$C_4H_9$ | " |
| 43 | S | —$C(CH_3)_3$ | " |
| 44 | S | —$C_6H_{13}$ | " |
| 45 | S | —$C_8H_{17}$ | " |
| 46 | S | —$CH_2CH\begin{matrix}C_2H_5\\C_4H_9\end{matrix}$ | " |
| 47 | S | —$C_9H_{19}$ | " |
| 48 | S | —$C_{13}H_{27}$ | " |
| 49 | S | —⟨H⟩ | " |
| 50 | S | —⟨H⟩—$CH_3$ | " |
| 51 | S | —⟨H⟩—$C_2H_5$ | " |
| 52 | S | —⟨H⟩—$C_4H_9$ | " |

Compounds 31 to 52 are distinguished by particularly high solubility in liquid crystal mixtures, e.g. ZLI-1691 or ZLI 1840 (Merck). The degrees of order are from 0.77 to 0.8.

Other compounds of high solubility are those of Examples 31 to 52 in which the 4-amino group is replaced by $C_6H_5NH$ or alkyl—$C_6H_4NH$ where alkyl is of 1 to 13 carbon atoms and is preferably in the para position.

We claim:

1. A liquid crystal guest-host composition for use in an electro-optical device, comprising a liquid crystalline host and a guest pleochroic coloring agent wherein said coloring agent is an anthraquinone compound represented by the formula:

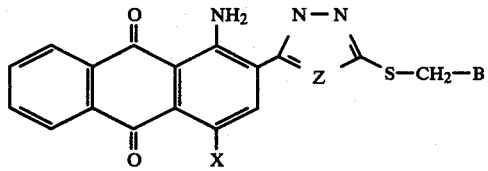

where
X is hydrogen, hydroxyl, nitro, phenylmercapto or substituted or unsubstituted amino,
Z is O or S and
B is substituted or unsubstituted phenyl.

2. A liquid crystal guest-host composition according to claim 1 containing as a coloring agent a compound of the formula:

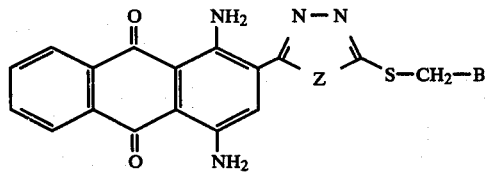

wherein Z and B have the meaning given for claim 1.

3. A liquid crystal guest-host composition according to claim 1 containing as a coloring agent a compound of the formula:

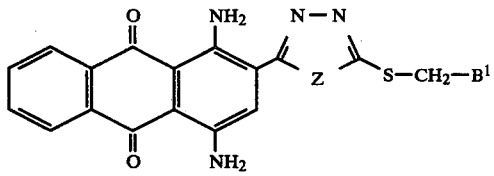

wherein
$B^1$ is phenyl or phenyl substituted by chlorine, cyano, alkyl, cycloalkyl, styryl, alkoxy, phenoxy, benzyloxy, alkanoyloxy, alkoxycarbaonyl, cyclohexylalkoxy or tetrahydrofurylmethyloxy, and Z has the meaning given for claim 1.

4. A liquid crystal guest-host composition according to claim 1 containing as a coloring agent a compound of the formula:

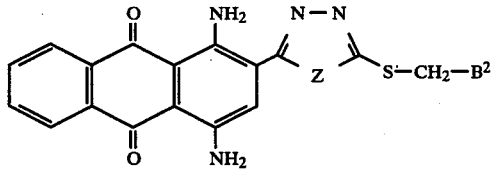

wherein
$B^2$ is phenyl substituted by alkyl or cycloalkyl and Z has the meaning given for claim 1.

* * * * *